(12) United States Patent
Zhang et al.

(10) Patent No.: US 12,148,129 B2
(45) Date of Patent: Nov. 19, 2024

(54) IMAGE DEHAZING METHOD AND SYSTEM BASED ON CYCLEGAN

(71) Applicant: NANJING UNIVERSITY OF POSTS AND TELECOMMUNICATIONS, Nanjing (CN)

(72) Inventors: Dengyin Zhang, Nanjing (CN); Chenghui Qi, Nanjing (CN); Yan Yang, Nanjing (CN); Yepeng Xu, Nanjing (CN); Wensheng Han, Nanjing (CN); Yonglian Ma, Nanjing (CN); Jinshuai Wang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 394 days.

(21) Appl. No.: 17/831,421

(22) Filed: Jun. 2, 2022

(65) Prior Publication Data

US 2022/0414838 A1   Dec. 29, 2022

Related U.S. Application Data

(63) Continuation of application No. PCT/CN2022/086885, filed on Apr. 14, 2022.

(30) Foreign Application Priority Data

Jun. 25, 2021 (CN) .......................... 202110713063.1

(51) Int. Cl.
*G06T 5/73* (2024.01)
*G06N 3/08* (2023.01)

(52) U.S. Cl.
CPC .................. *G06T 5/73* (2024.01); *G06N 3/08* (2013.01); *G06T 2207/20081* (2013.01); *G06T 2207/20084* (2013.01)

(58) Field of Classification Search
CPC ............ G06T 5/73; G06T 2207/20081; G06T 2207/20084; G06T 5/60; G06T 5/92;
(Continued)

(56) References Cited

U.S. PATENT DOCUMENTS

| 10,762,650 B1* | 9/2020 | Guo .......................... G06T 5/00 |
| 2019/0145784 A1* | 5/2019 | Ma .......................... G06F 16/29 |
| | | 701/448 |

(Continued)

FOREIGN PATENT DOCUMENTS

| CN | 109544442 A | 3/2019 |
| CN | 109635774 A | 4/2019 |

*Primary Examiner* — Akwasi M Sarpong
*Assistant Examiner* — Michael L Burleson (57) ABSTRACT

Disclosed are an image dehazing method and system based on CycleGAN. The method comprises: acquiring a to-be-processed hazy image; and inputting the image into a pre-trained densely connected CycleGAN, and outputting a clear image. The densely connected CycleGAN comprises a generator, the generator comprises an encoder, a converter and a decoder, the encoder comprises a densely connected layer for extracting features of an input image, the converter comprises a transition layer for combining the features extracted at the encoder stage, the decoder comprises a densely connected layer and a scaled convolutional neural network layer, the densely connected layer is used for restoring original features of the image, and the scaled convolutional neural network layer is used for removing a checkerboard effect of the restored original features to obtain a finally output clear image.

12 Claims, 3 Drawing Sheets

(58) Field of Classification Search
CPC ...... G06N 3/08; G06N 3/0455; G06N 3/0464; G06N 3/0475; G06N 3/088
See application file for complete search history.

(56) References Cited

U.S. PATENT DOCUMENTS

| | | |
|---|---|---|
| 2022/0138912 A1 | 5/2022 | Zhang et al. |
| 2023/0154140 A1* | 5/2023 | Hu ...................... G06V 10/454 382/195 |

* cited by examiner

IMAGE DEHAZING METHOD AND SYSTEM BASED ON CYCLEGAN

CROSS-REFERENCE TO RELATED APPLICATIONS

This application is a continuation of International Patent Application No. PCT/CN2022/086885 with a filing date of Apr. 14, 2022, designating the United States, and further claims priority to Chinese Patent Application No. 202110713063.1 with a filing date of Aug. 6, 2021. The content of the aforementioned applications, including any intervening amendments thereto, are incorporated herein by reference.

TECHNICAL FIELD

The present invention relates to an image dehazing method and system based on CycleGAN, and belongs to the field of image processing technologies.

BACKGROUND

Under a social condition of rapid development of informationization, an image video is a main source for people to acquire information, and an image quality also seriously affects the reading and judgment of information. Nowadays, operations of a satellite remote sensing system, an aerial photography system, and an outdoor monitoring and target recognition systems all depend on an optical imaging instrument. However, due to a haze weather, a clarity of a collected photo may be affected, showing characteristics of a reduced contrast, a blurred image and seriously insufficient extractable features. These characteristics not only reduce an ornamental value of an image, but also affect post-processing of the image. Therefore, in order to provide researchers with a clear and feature-rich image and operate a computer vision system normally, the research of image dehazing is very necessary.

With the wide application of computer vision day by day and the development and maturity of a computer technology, an image dehazing technology has achieved considerable research results. Processing algorithms for a hazy image are mainly divided into three categories. A first category is based on an image enhancement algorithm, and a dehazing method based on image enhancement is to enhance a degraded image, improve the image quality, and highlight features and valuable information of scenes in the image. However, this method does not consider causes of image degradation, and may lead to a loss of partial information of the image after processing, resulting in distortion. A second category is a method based on an atmospheric scattering model, and this method is to estimate parameters of the atmospheric scattering model according to some prior knowledge of a clear image first, and then substitute the parameters into the model to restore the clear image. The clear image processed by this method is clearer and more natural, with less detail loss, but different prior knowledge has limitations in their respective application scenarios. A third category is a method based on deep learning, and in most researches, data of a composite hazy image is used as a training set, and different types of convolutional neural networks are trained to estimate a transmittance or directly estimate the clear image. Representative networks comprise Dehazenet, MSCNN, AOD-NET, and DCPN, but these networks generally need large-scale training data sets and clear and hazy image pairs, and once the conditions are not met, these learning-based methods will fail. However, in fact, due to effects of a change of scene and other factors, it is very difficult to collect a large number of pairwise data sets with a required scene authenticity. However, an information content of the composite hazy image is inconsistent with that of a real hazy image, which affects a dehazing effect.

SUMMARY

The technical problem to be solved by the present invention is to overcome the defects in the prior art, provide an image dehazing method and system based on CycleGAN, and solve problems faced by an existing image dehazing method based on deep learning, comprising lack of real pairwise data sets, insufficient image dehazing feature learning based on CycleGAN, and an artifact of a generated image affecting an image dehazing quality.

In order to solve the technical problems above, the present invention provides an image dehazing method based on CycleGAN, comprising the following steps of:
acquiring a to-be-processed hazy image; and
inputting the image into a pre-trained densely connected CycleGAN, and outputting a clear image;
wherein the densely connected CycleGAN comprises a generator, the generator comprises an encoder, a converter and a decoder, the encoder comprises a densely connected layer for extracting features of an input image, the converter comprises a transition layer for combining the features extracted at the encoder stage, the decoder comprises a densely connected layer and a scaled convolutional neural network layer, the densely connected layer is used for restoring original features of the image, and the scaled convolutional neural network layer is used for removing a checkerboard effect of the restored original features to obtain a finally output clear image.

Further, the converter stage also comprises a residual dense block, the residual dense block comprises a densely connected layer and a transition layer, the densely connected layer is used for combining and splicing the features extracted by the encoder, and the transition layer is used for keeping dimensions of the input image and the output image the same, thus facilitating further operations of the decoder subsequently.

Further, the densely connected CycleGAN further comprises a skip layer, which connects the encoder with the decoder, and is used for transmitting a data information stream.

Further, the training process of the densely connected CycleGAN comprises:
allowing the densely connected CycleGAN to further comprise a discriminator Dx and a discriminator Dy, and two generators which are a generator G and a generator F, wherein the generator G and the generator F, and the discriminator Dx and the discriminator Dy respectively have the same network structure;
randomly selecting N clear images and N hazy images as training samples from Reside data set, recording the training samples of the hazy images as a data set P(x), and recording the training samples of the clear images as a data set P(y);
marking the data set P(x) and the data set P(y), and training the discriminator Dx and the discriminator Dy by using the data set P(x) and the data set P(y) marked, so that the discriminator Dx and the discriminator Dy are capable of judging that the discriminator result is marked as 1 if two hazy images are input, the discriminator result is also marked as 1 if two clear images are input, and the discriminator result is marked as 0 if one hazy image and one clear image are input respectively;

initializing weight parameters W of networks of the generators and the discriminators;

after initializing, determining input samples according to the data set P(x) and the data set P(y);

according to the input samples, fixing the weight parameters of the generators to train the discriminators first, updating final weight parameters of the discriminators by using a random gradient descent algorithm, then fixing the weight parameters of the discriminators as the updated final weight parameters of the discriminators to train the generators, and updating final weight parameters of the generators by using the random gradient descent algorithm; and determining the trained densely connected CycleGAN according to the final weight parameters of the discriminators and the final weight parameters of the generators.

Further, the random gradient descent algorithm comprises:

updating the weight parameters according to the input sample by the following update formula, wherein the update formula is:

$$W' = W - \alpha \frac{\partial L_G}{\partial W} \quad (8)$$

wherein, α is a basic learning rate, W' is the updated weight parameter, and $L_G$ is a total loss function, $$L_G = L_{gan} + L_{cyc}(G,F) + \gamma L_{per}(G,F)$$

$L_{gan}$ is an overall adversarial loss function, $$L_{gan} = L_{gan1} + L_{gan2}$$

$L_{gan1}$ is an adversarial loss function of the generator G and the discriminator Dy:

$$L_{gan1} = E_{y \sim P(y)}[\log D_y(y)] + E_{x \sim P(x)}[\log(1 - D_y(G(x)))]$$

$L_{gan2}$ is an adversarial loss function of the generator F and the discriminator Dx:

$$L_{gan2} = E_{x \sim P(x)}[\log D_x(x)] + E_{y \sim P(y)}[\log(1 - D_x(F(y)))]$$

x represents the hazy image, y represents the clear image, x-P(x) represents that x follows distribution of the data set sample P(x), y-P(y) represents that y follows distribution of the data set sample P(y), G(x) is the clear image generated by the generator G from the hazy image in the data set P(x), F(y) is the hazy image generated by the generator F from the clear image in the data set P(y), E represents a mathematical expectation, $D_y(y)$ and $D_y(G(x))$ respectively represent discrimination results of the discriminator Dy on the clear image y and G(x); and $D_x(x)$ and $D_x(F(y))$ respectively represent discrimination results of the discriminator Dx on x and F(y);

$L_{cyc}(G, F)$ is a cycle-consistency loss function:

$$L_{cyc}(G,F) = E_{x \sim P(x)}[\|F(G(x)) - x\|_1] + E_{y \sim P(y)}[\|G(F(y)) - y\|_1]$$

F(G(x)) is the hazy image regenerated by the generator F from the clear image G(x); and G(F(y)) is the clear image regenerated by the generator G from the hazy image F(y), $L_{per}(G, F)$ is a perceptual loss function;

$$L_{per}(G,F) = \|\varphi(x) - \varphi(F(G(x)))\|_2^2 + \|\varphi(y) - \varphi(G(F(y)))\|_2^2$$

$\varphi(x)$ and $\varphi(y)$ respectively represent features of x and y output after passing through a convolutional layer of a VGG16 network, re-acquiring the input samples, repeating the above steps, allowing the total loss function to be stabilized or a number of cycles to reach a preset threshold by constantly adjusting the weight parameters, and then stopping training and outputting the final weights, wherein a judgment condition for stabilization is that a loss function error E of successive cycles is stable and no more than 0.001.

A computer-readable storage medium stores one or more programs, and the one or more programs comprise instructions which, when executed by a computing device, enables the computing device to execute any one of the methods.

An image dehazing system based on CycleGAN comprises:

one or more processors, a memory, and one or more programs, wherein the one or more programs are stored in the memory and configured to be executed by the one or more processors, and the one or more programs comprise instructions for executing any one of the methods.

The present invention achieves the beneficial effects as follows:

firstly, image dehazing is carried out based on CycleGAN, requirements for the pairwise data sets are eliminated, and a problem that an artificially synthesized data set training network cannot be applied to a real dehazing scene is solved;

secondly, a densely connected structure in a DenseNet network and a residual structure in a ResNet network are introduced into a generator network, which increases capacities of network parameters, improves a utilization rate of the feature image, solves problems of insufficient feature learning in the CycleGAN and insufficient image details, and maintains a network training efficiency; and thirdly, aiming at a problem of a network artifact of the generator network in the CycleGAN, the scaled convolutional neural network is added in the decoder to remove the network artifact, thus improving a quality of the generated image.

DETAILED DESCRIPTION

The present invention is further described hereinafter with reference to the accompanying drawings. The following embodiments are only used to illustrate the technical solutions of the present invention more clearly, and cannot be used to limit the scope of protection of the present invention.

Figure 1:
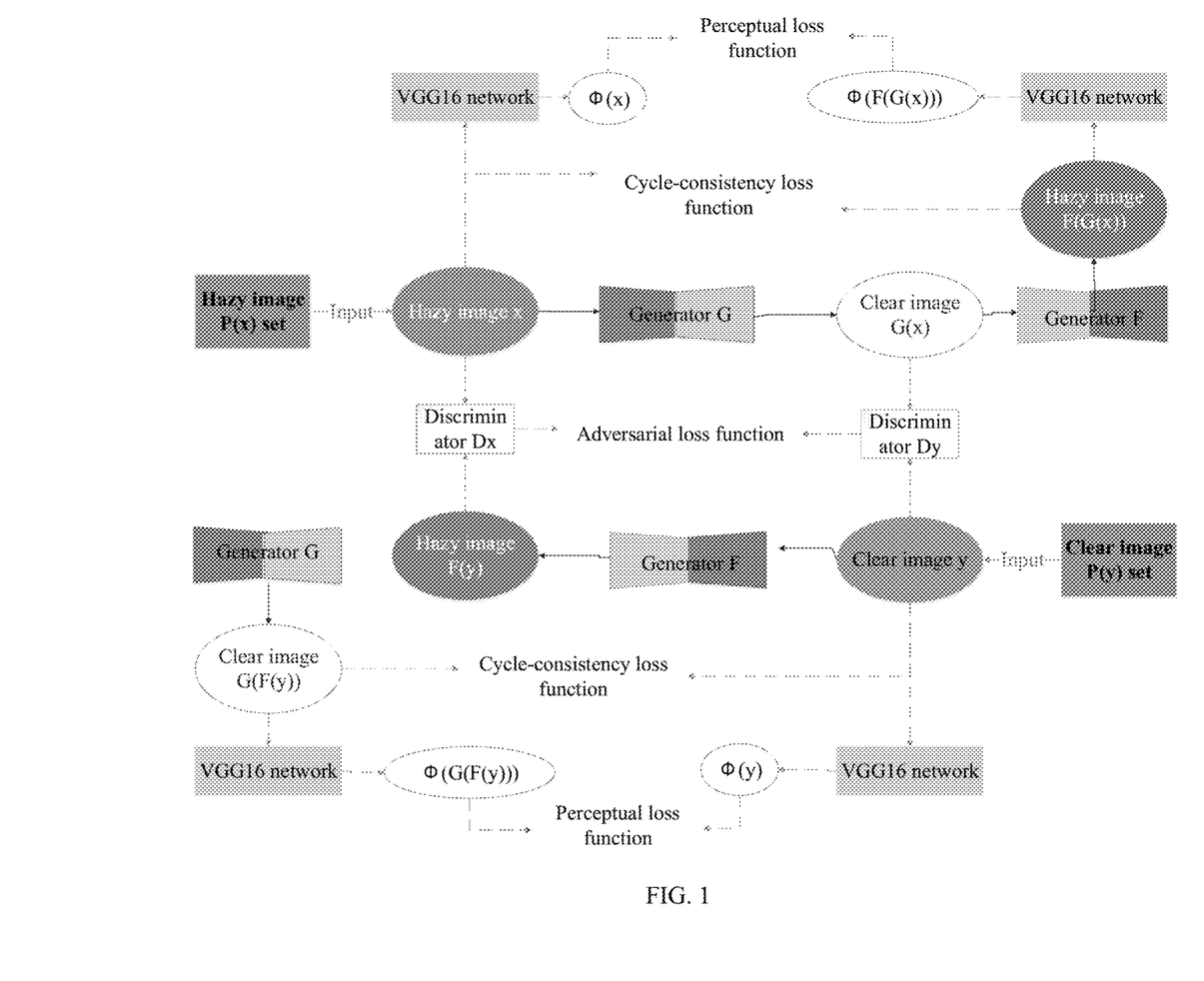
FIG. 1 is a flow chart of a whole network architecture implemented by the method according to the present invention.

FIG. 1 is a flow chart of a whole network architecture implemented by an image dehazing method based on CycleGAN according to the present invention.

In step 1, a residual dense CycleGAN is constructed and designed.

Firstly, in a Reside data set (commonly used data set for an image dehazing research), 150 clear images and 150 hazy images are randomly selected as training samples, and recorded as a P(x) set (hazy images) and a P(y) set (clear clear images) respectively, and pixels of the two sets of images are uniformly adjusted to be 256×256. In addition, 50 hazy images and 50 clear images are selected and recorded as A and B sets respectively for pre-training discriminators Dx and Dy. One hazy image and one clear image are read from two data sets P(x) and P(y) respectively (the selected images do not need to be pairwise), and input into the residual dense CycleGAN for processing at the same time.

During operation of the system, two generators G and F generate four output results, which are respectively as follows: when the hazy image is input, a defogged image and a cycle generative hazy image are output; and when the clear image is input, a generative hazy image and a cycle generative clear image are output.

On one hand, the generator G generates a corresponding clear image G(x) from the hazy image in the data set P(x), and on the other hand, the generator F generates a hazy image F(y) from the clear image in the data set P(y).

The discriminator Dy is used to judge a quality of the clear image generated by the generator G, and the discriminator Dx is used to judge a quality of the hazy image generated by the generator F. An output value range of the discriminator is [0,1], if an output value of the discriminator is close to 0, the generator is continuously trained; and if the output value of the discriminator is close to 1, it is proved that a quality of image generated by the generator meets requirements, and the discriminator may be further trained. During continuous game between the generator and the discriminator, the quality of image generated by the generator is better, and a discriminating capability of the discriminator is stronger.

Further, in order to restrict feature conversion between the hazy image and the clear image so as to make the G and F generators realize cooperative optimization, the generator F generates a hazy image F(G(x)) from the clear image G(x); and the generator G generates a clear image G(F(y)) from the hazy image F(y). Through training, x is continuously close to F(G(x)) and y is continuously close to G(F(y)) to obtain an optimum dehazing model.

The images are normalized for storing. Weakly supervised image dehazing is realized through this network structure.

Figure 2:
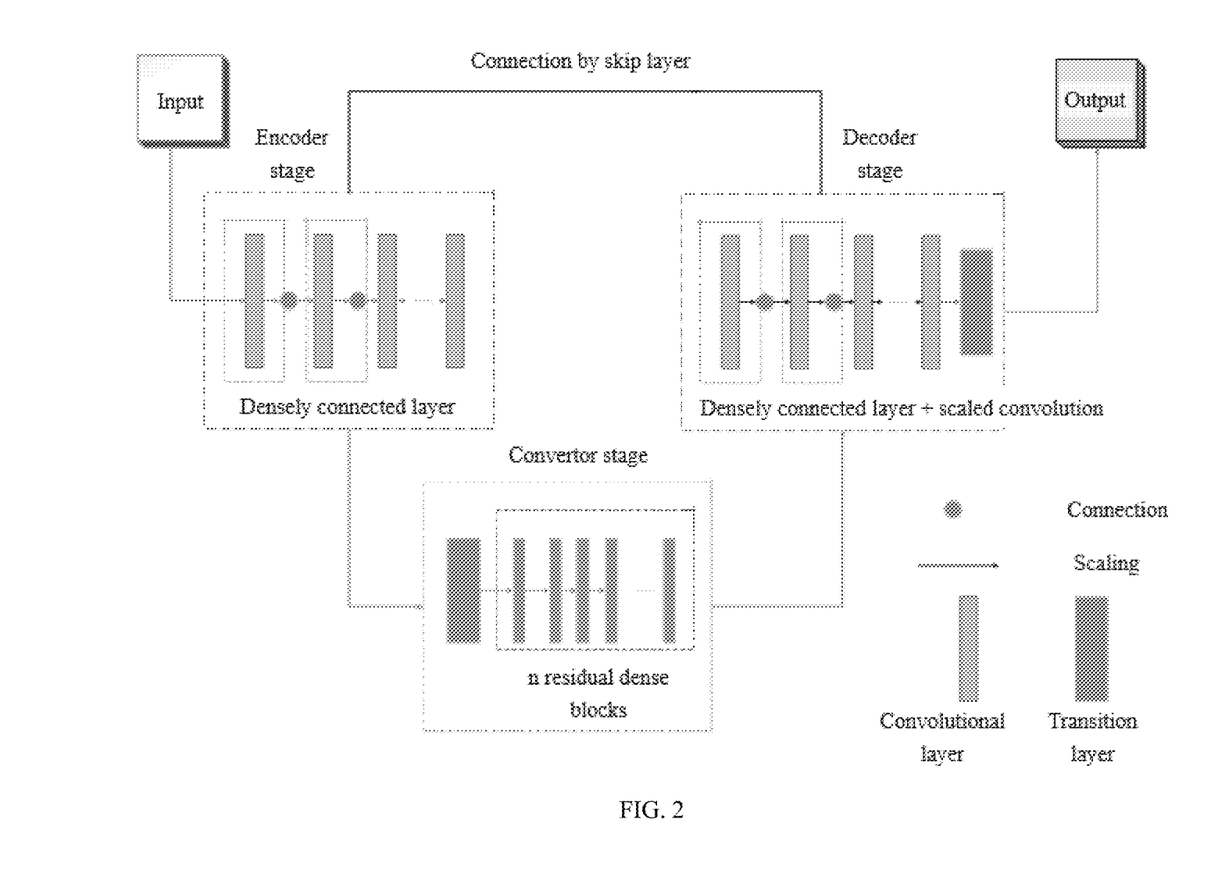
FIG. 2 is a schematic structural diagram of a generator of a residual dense CycleGAN in an embodiment of the method according to the present invention.

Further, a network structure of the generator is designed. FIG. 2 is a schematic structural diagram of the generator of the residual dense CycleGAN in the embodiment of the method of the present invention. A network of the generator is divided into three stages: an encoder stage, a converter stage and a decoder stage.

At the encoder stage, features of an input image are extracted, an original convolutional operation is replaced with a densely connected layer herein to improve a utilization rate of a feature image. The densely connected layer comprises three densely connected convolutional layers which have a size of 3×3 and are filled as 2. The feature images are spliced in a depth direction in the densely connected layer.

At the converter stage: the features extracted at the encoder stage are combined, and the feature image is processed through a conversion layer, with a convolutional scale of 1×1. The conversion layer is followed by N residual dense blocks to increase capacities of network parameters, and a number of N may be adjusted later according to a training situation. The residual dense blocks contain the densely connected layer and a transition layer. After dense connection, the transition layer carries out transition on a dense connection result, comprising normalization and activation. The transited feature image may be added to input data component by component to form an identity mapping layer. After transition, an output of the densely connected layer has the same dimension as the input data, which ensures a residual operation. In this process, a resolution of the feature image processed by the network is low, and a convolutional calculation amount is small, so that the densely connected residual blocks will not greatly affect a network efficiency while deepening the network to improve the utilization rate.

At the decoder stage, the original features of the image are restored, a corresponding image is generated, and dense connection is also used in up-sampling of the decoder. Particularly, a scaled convolutional operation is added herein to eliminate a checkerboard artifact effect, which means that a nearest neighbor interpolation is used to scale the image to a target size, and then the convolutional operation is carried out. Finally, a final image result is output by combining the features restored by up-sampling.

Further, a skip layer is introduced between the encoder and decoder for connection, and a data information stream is transmitted, so as to provide more information transmission between encoding and decoding.

Figure 3:
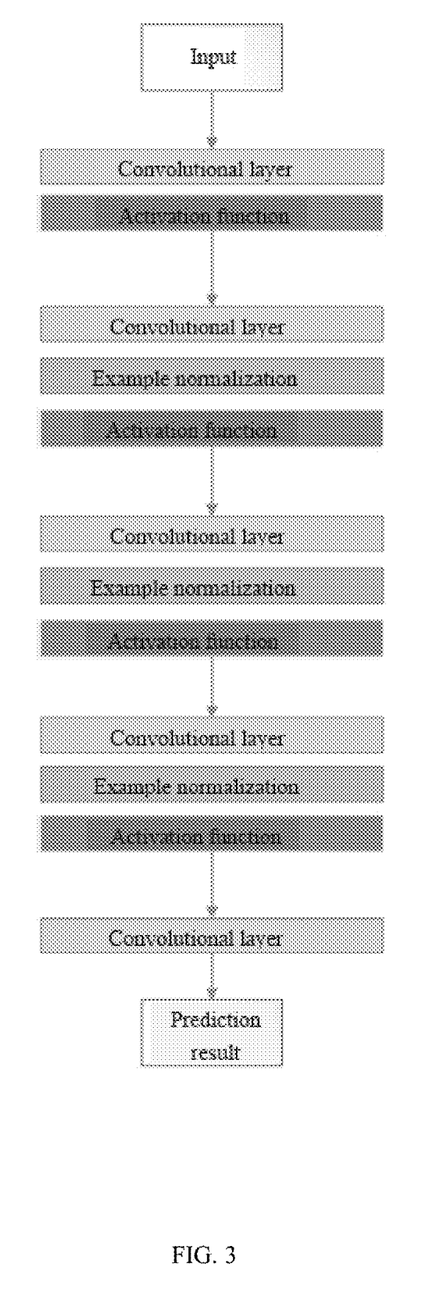
FIG. 3 is a diagram of a network structure of a discriminator.

Further, the network structure of the discriminator is designed. FIG. 3 is a diagram of the network structure of the discriminator. The discriminator designed herein is a fully convolutional network, and five convolutional networks with a size of 4×4 are used to extract features. The first layer comprises a convolutional layer and a LeakyReLu activation function; three middle convolutional layers are compressed and upgraded in size, then normalized in batches to accelerate a convergence of the network, and then activated by the activation function; and the last layer only contains convolutional computation to maintain a stability during training.

In step 2, a loss function is constructed, the loss function comprises an adversarial loss, a cycle-consistency loss and a perceptual loss. The adversarial loss and the cycle-consistency loss are inherent loss functions in the CycleGAN, which can complete training of asymmetric data used in a model. Meanwhile, in order to improve a generative quality of image, a perceptual loss function is particularly introduced to strengthen restriction on a quality of generative image.

The adversarial loss is used to restrict generation of image in an adversarial process. An adversarial loss of the generator G and the discriminator Dy is recorded as:

$$L_{gan1} = E_{y \sim P(y)}[\log D_y(y)] + E_{x \sim P(x)}[\log (1 - D_y(G(x)))] \quad (2)$$

Similarly, an adversarial loss of the generator F and the discriminator Dx is recorded as:

$$L_{gan2} = E_{x \sim P(x)}[\log D_x(x)] E_{y \sim P(y)}[\log (1 - D_x(G(y)))] \quad (3)$$

Therefore, an overall adversarial loss function is recorded as:

$$L_{gan} = L_{gan1} + L_{gan2} \quad (4)$$

wherein x represents the hazy image, y represents the clear image, x-P(x) represents that x follows distribution of the data set sample P(x), y-P(y) represents that y follows distribution of the data set sample P(y), and E represents a mathematical expectation.

The cycle-consistency loss is used to restrict mutual conversion between hazy image data and clear image data, thus solving a problem that output distribution cannot be consistent with target distribution in the case of the adversarial loss only, and is recorded as:

$$L_{cyc}(G,F)=E_{x\sim P(x)}[\|F(G(x))-x\|_1]+E_{y\sim P(y)}[\|G(F(y))-y\|_1] \quad (5)$$

wherein F(G(x)) is a cycle image of an original image, which returns a result G (x) of the generator to the original image. G(F(y)) is a cycle image of an original image y, which may return F(y) to the original image y. The training aims to make F(G(x)) continuously close to x and make G(F(y)) continuously close toy.

The perceptual loss restricts perceptual details of image generation from a high-level semantic perspective. An excessively smooth result and a detail loss may be caused by only using the first two losses. The perceptual loss calculates a distance between a result generated by the network and a feature image of a true value output at a specific layer of a pre-trained VGG network (a classical network structure in a convolutional neural network). The perceptual loss is represented as:

$$L_{per}(G,F)=\|\phi(x)-\phi(F(G(x)))\|_2^2+\|\phi(y)-\phi(G(F(y)))\|_2^2 \quad (6)$$

wherein ø(x) and ø(y) respectively represent features of x and y output after passing through a convolutional layer of a VGG16 network.

The total loss function is represented as:

$$L_G=L_{gan}+L_{cyc}(G,F)+\gamma L_{per}(G,F) \quad (7)$$

wherein γ is a weight ratio of the perceptual loss function, which reflects a degree of influence of a part in which the perceptual loss function exists on the total loss function, and is taken as 0.6 herein.

In step 3, the network is trained.

The discriminator is pre-trained first, and the discriminator may judge whether an image is a real hazy image or a real clear image only by knowing a pixel distribution feature of fog on the image, such as intensity distribution and position distribution. Two data sets A and B selected in step 1 are used to train the discriminators. During training, the discriminators may preliminarily judge features of fog by marking. The discriminator result is marked as 1 if two hazy images are input; similarly, the discriminator result is also marked as 1 if two clear images are input; and the discriminator result is marked as 0 if one hazy image and one clear image are input respectively. Through pre-training of the discriminator, a game process between the discriminator and the generator in the later stage is more real and effective.

Further, the whole network is trained. A weight parameter W of the network at each stage is initialized first, and a decimal number is randomly selected between [−0.1, 0.1] as the initialized weight parameter. After initialization, the weight parameter is updated by using a random gradient descent algorithm. An update rule is:

$$W' = W - \alpha \frac{\partial L_G}{\partial W} \quad (8)$$

wherein α is a basic leaning rate.

Basic learning rates of the generators G and F are both set as 0.0001, and a maximum number of training times of samples is preset as 500. For each pair of input samples, a total error is obtained by forward propagation first, then a partial derivative of each weight parameter is obtained by backward propagation, and finally the weight parameter is updated according to formula (8).

During training of the network, weight parameters of the generators are fixed to train the discriminators first, and declines of the adversarial loss, the cycle-consistency loss and the perceptual loss are recorded respectively. Further, weight parameters of the discriminators are iteratively and constantly updated during forward propagation and backward propagation. Subsequently, the discriminators are fixed similarly to train the generators, and the weight parameters of the generators are constantly updated.

The above steps are repeated, the total loss function in formula (6) is stabilized by constantly adjusting the weight parameters, and a judgment condition for stabilization herein is that a loss function error E of 10 successive adjacent cycles is stabilized to be about 0.001. When a number of training times reaches 500 or ∈ <0.001, the training is stopped.

In step 4, the hazy image is input into a pre-trained densely connected CycleGAN to obtain the clear image.

Correspondingly, the present invention further provides a computer-readable storage medium storing one or more programs, wherein the one or more programs comprise instructions which, when executed by a computing device, enables the computing device to execute any one of the methods.

Correspondingly, the present invention further provides an image dehazing system based on CycleGAN, which comprises:

one or more processors, a memory, and one or more programs, wherein the one or more programs are stored in the memory and configured to be executed by the one or more processors, and the one or more programs comprise instructions for executing any one of the methods.

In the present invention, the densely connected CycleGAN is used for image dehazing, which belongs to end-to-end dehazing, and input of the hazy image may realize direct output of the clear image. Due to use of the CycleGAN, a problem of lack of real pairwise data sets faced by an existing image dehazing method based on deep learning may be solved. A densely connected and residual network structure is introduced, and a CycleGan network structure is optimized, so that the capacities of the network parameters are increased, and the utilization rate of the feature image is improved. A problem of insufficient feature learning in the CycleGAN is solved, and scaled convolution is used to avoid a network artifact at the same time, so that the quality of generative image is improved.

It should be appreciated by those skilled in this art that the embodiment of the present application may be provided as methods, systems or computer program products. Therefore, the embodiments of the present application may take the form of complete hardware embodiments, complete software embodiments or software-hardware combined embodiments. Moreover, the embodiments of the present application may take the form of a computer program product embodied on one or more computer usable storage media (including but not limited to disk storage, CD-ROM, optical storage, etc.) in which computer usable program codes are included.

The present application is described with reference to the flow charts and/or block diagrams of the method, apparatus (system), and computer program products according to the embodiments of the present disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing apparatus to produce a machine for the instructions executed by the computer or the processor of other programmable data processing apparatus to generate a device for implementing the functions specified in one or more flows of the flow chart and/or in one or more blocks of the block diagram.

These computer program instructions may also be provided to a computer readable memory that can guide the computer or other programmable data processing apparatus to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable data processing apparatus, so that a series of operating steps are executed on the computer, or other programmable data processing apparatus to produce processing implemented by the computer, so that the instructions executed in the computer or other programmable data processing apparatus provide steps for implementing the functions specified in one or more flows of the flow chart and/or in one or more blocks of the block diagram.

The description above is merely the preferred implementations of the present invention, and it should be pointed out that those of ordinary skills in the art may further make several improvements and variations without departing from the technical principle of the present invention, and these improvements and variations should also be regarded as falling within the scope of protection of the present invention.

The invention claimed is:

1. An image dehazing method based on CycleGAN, comprising the following steps of:
acquiring a to-be-processed hazy image; and
inputting the to-be-processed hazy image into a pre-trained densely connected CycleGAN, and outputting a clear image;
wherein the densely connected CycleGAN comprises a generator, the generator comprises an encoder, a converter and a decoder, the encoder comprises a densely connected layer for extracting features of an input image, the converter comprises a transition layer for combining the features extracted at an encoder stage, the decoder comprises a densely connected layer and a scaled convolutional neural network layer, the densely connected layer is used for restoring original features of the to-be-processed hazy image, and the scaled convolutional neural network layer is used for removing a checkerboard effect of the restored original features to obtain a finally output clear image;
wherein the converter stage also comprises a residual dense block, the residual dense block comprises a densely connected layer and a transition layer, the densely connected layer is used for combining and splicing the features extracted by the encoder, and the transition layer is used for keeping dimensions of the input image and the output image the same.

2. The image dehazing method based on CycleGAN according to claim 1, wherein the densely connected CycleGAN further comprises a skip layer, which connects the encoder with the decoder, and is used for transmitting a data information stream.

3. The image dehazing method based on CycleGAN according to claim 1, wherein the training process of the densely connected CycleGAN comprises:
allowing the densely connected CycleGAN to further comprise a discriminator Dx and a discriminator Dy, and two generators which are a generator G and a generator F, wherein the generator G and the generator F, and the discriminator Dx and the discriminator Dy respectively have the same network structure;
randomly selecting N clear images and N hazy images as training samples from a Reside data set, recording the training samples of the hazy images as a data set P(x), and recording the training samples of the clear images as a data set P(y);
marking the data set P(x) and the data set P(y), and training the discriminator Dx and the discriminator Dy by using the data set P(x) and the data set P(y) marked, so that the discriminator Dx and the discriminator Dy are capable of judging that the discriminator result is marked as 1 in response that two haze images are input, the discriminator result is also marked as 1 in response that two clear images are input, and the discriminator result is marked as 0 in response that one hazy image and one clear image are input respectively;
initializing weight parameters W of networks of the generator G and the generator F, and the discriminator Dx and the discriminator Dy;
after initializing, determining input samples according to the data set P(x) and the data set P(y);
according to the input samples, fixing the weight parameters of the generator G and the generator F to train the discriminators first, updating final weight parameters of the discriminator Dx and the discriminator Dy by using a random gradient descent algorithm, then fixing the weight parameters of the discriminator Dx and the discriminator Dy as the updated final weight parameters of the discriminator Dx and the discriminator Dy to train the generator G and the generator F, and updating final weight parameters of the generator G and the generator F by using the random gradient descent algorithm; and
determining the trained densely connected CycleGAN according to the final weight parameters of the discriminator Dx and the discriminator Dy and the final weight parameters of the generator G and the generator F.

4. The image dehazing method based on CycleGAN according to claim 3, wherein the random gradient descent algorithm comprises:
updating the weight parameters according to the input sample by the following update formula, wherein the update formula is:

$$W' = W - \alpha \frac{\partial L_G}{\partial W} \qquad (8)$$

wherein, $\alpha$ is a basic learning rate, W' is the updated weight parameter, and $L_G$ is a total loss function, $$L_G = L_{gan} + L_{cyc}(G,F) + \gamma L_{per}(G,F)$$

$L_{gan}$ is an overall adversarial loss function, $$L_{gan} = L_{gan1} + L_{gan2}$$

$L_{gan1}$ is an adversarial loss function of the generator G and the discriminator Dy:

$$L_{gan1}=E_{y\sim P(y)}[\log D_y(y)]+E_{x\sim P(x)}[\log(1-D_y(G(x)))]$$

$L_{gan2}$ is an adversarial loss function of the generator F and the discriminator Dx:

$$L_{gan2}=E_{x\sim P(x)}[\log D_x(x)]+E_{y\sim P(y)}[\log(1-D_x(F(y)))]$$

x represents the hazy image, y represents the clear image, x-P(x) represents that x follows distribution of the data set sample P(x), y-P(y) represents that y follows distribution of the data set sample P(y), G(x) is the clear image generated by the generator G from the hazy image in the data set P(x), F(y) is the hazy image generated by the generator F from the clear image in the data set P(y), E represents a mathematical expectation, $D_y(y)$ and $D_y(G(x))$ respectively represent discrimination results of the discriminator Dy on the clear image y and G(x); and $D_x(x)$ and $D_x(F(y))$ respectively represent discrimination results of the discriminator Dx on x and F(y);

$L_{cyc}(G, F)$ is a cycle-consistency loss function:

$$L_{cyc}(G,F)=E_{x\sim P(x)}[||F(G(x))-x||_1]+E_{y\sim P(y)}[||G(F(y))-y||_1]$$

F(G(x)) is the hazy image regenerated by the generator F from the clear image G(x); and G(F(y)) is the clear image regenerated by the generator G from the hazy image F(y), $L_{per}(G, F)$ is a perceptual loss function;

$$L_{per}(G,F)=||\phi(x)-\phi(F(G(x)))||_2^2+||\phi(y)-\phi(G(F(y)))||_2^2$$

ø(x) and ø(y) respectively represent features of x and y output after passing through a convolutional layer of a VGG16 network, re-acquiring the input samples, repeating the above steps, allowing the total loss function to be stabilized or a number of cycles to reach a preset threshold by constantly adjusting the weight parameters, and then stopping training and outputting the final weights, wherein a judgment condition for stabilization is that a loss function error of successive cycles is stable and no more than 0.001.

5. A non-transitory computer readable storage medium storing one or more programs, wherein the one or more programs comprise instructions which, when executed by a computing device, enables the computing device to execute the method according to claim 1.

6. A non-transitory computer readable storage medium storing one or more programs, wherein the one or more programs comprise instructions which, when executed by a computing device, enables the computing device to execute the method according to claim 2.

7. A non-transitory computer readable storage medium storing one or more programs, wherein the one or more programs comprise instructions which, when executed by a computing device, enables the computing device to execute the method according to claim 3.

8. A non-transitory computer readable storage medium storing one or more programs, wherein the one or more programs comprise instructions which, when executed by a computing device, enables the computing device to execute the method according to claim 4.

9. An image dehazing system based on CycleGAN, comprising:
one or more processors, a memory, and one or more programs, wherein the one or more programs are stored in the memory and configured to be executed by the one or more processors, and the one or more programs comprise instructions for executing the method according to claim 1.

10. An image dehazing system based on CycleGAN, comprising:
one or more processors, a memory, and one or more programs, wherein the one or more programs are stored in the memory and configured to be executed by the one or more processors, and the one or more programs comprise instructions for executing the method according to claim 2.

11. An image dehazing system based on CycleGAN, comprising:
one or more processors, a memory, and one or more programs, wherein the one or more programs are stored in the memory and configured to be executed by the one or more processors, and the one or more programs comprise instructions for executing the method according to claim 3.

12. An image dehazing system based on CycleGAN, comprising:
one or more processors, a memory, and one or more programs, wherein the one or more programs are stored in the memory and configured to be executed by the one or more processors, and the one or more programs comprise instructions for executing the method according to claim 4.

* * * * *